United States Patent

[11] 3,587,317

| [72] | Inventor | Edgar J. Ruof<br>Akron, Ohio |
|---|---|---|
| [21] | Appl. No. | 782,314 |
| [22] | Filed | Dec. 9, 1968 |
| [45] | Patented | June 28, 1971 |

[54] BRAKE TEMPERATURE MEASURING SYSTEM HAVING ONE VISUAL METER AND ONE VISUAL HIGH TEMPERATURE INDICATOR
5 Claims, 1 Drawing Fig.

[52] U.S. Cl. .................................................... 73/342,
73/362, 340/228
[51] Int. Cl. .................................................... G01k 7/16,
G08b 17/06
[50] Field of Search .......................................... 73/342,
362; 340/228, 233

[56] References Cited
UNITED STATES PATENTS

| 2,456,499 | 12/1948 | Fritzinger | 73/342X |
|---|---|---|---|
| 2,494,269 | 1/1950 | Sparkes | 73/342X |
| 2,686,293 | 8/1954 | Davis | 73/342X |
| 2,718,148 | 9/1955 | Knudsen | 73/342 |
| 3,036,464 | 5/1962 | Beeston | 73/342 |
| 3,096,649 | 7/1963 | Howard | 73/342 |
| 2,901,740 | 8/1959 | Cutsogeorge | 340/233 |
| 3,106,647 | 10/1963 | Danko | (340/228) |
| 3,454,925 | 7/1969 | Ruof | 73/342X |

*Primary Examiner*—S. Clement Swisher
*Assistant Examiner*—Frederick Shoon
*Attorneys*—F. W. Brunner, P. E. Milliken and Oldham and Oldham ABSTRACT: The invention relates to a brake temperature indication system which connects a plurality of thermal indicating transducers through amplifiers to a common outlet point, amplifies the signal received at the common outlet point which is as high as the highest indicating transducer. A light control circuit is driven by the amplified signal from the common outlet point with positive on and positive off characteristics to prevent dimming and flickering. A visual meter is also provided to selectively test which transducer is giving the high-temperature signal.

PATENTED JUN 28 1971
3,587,317
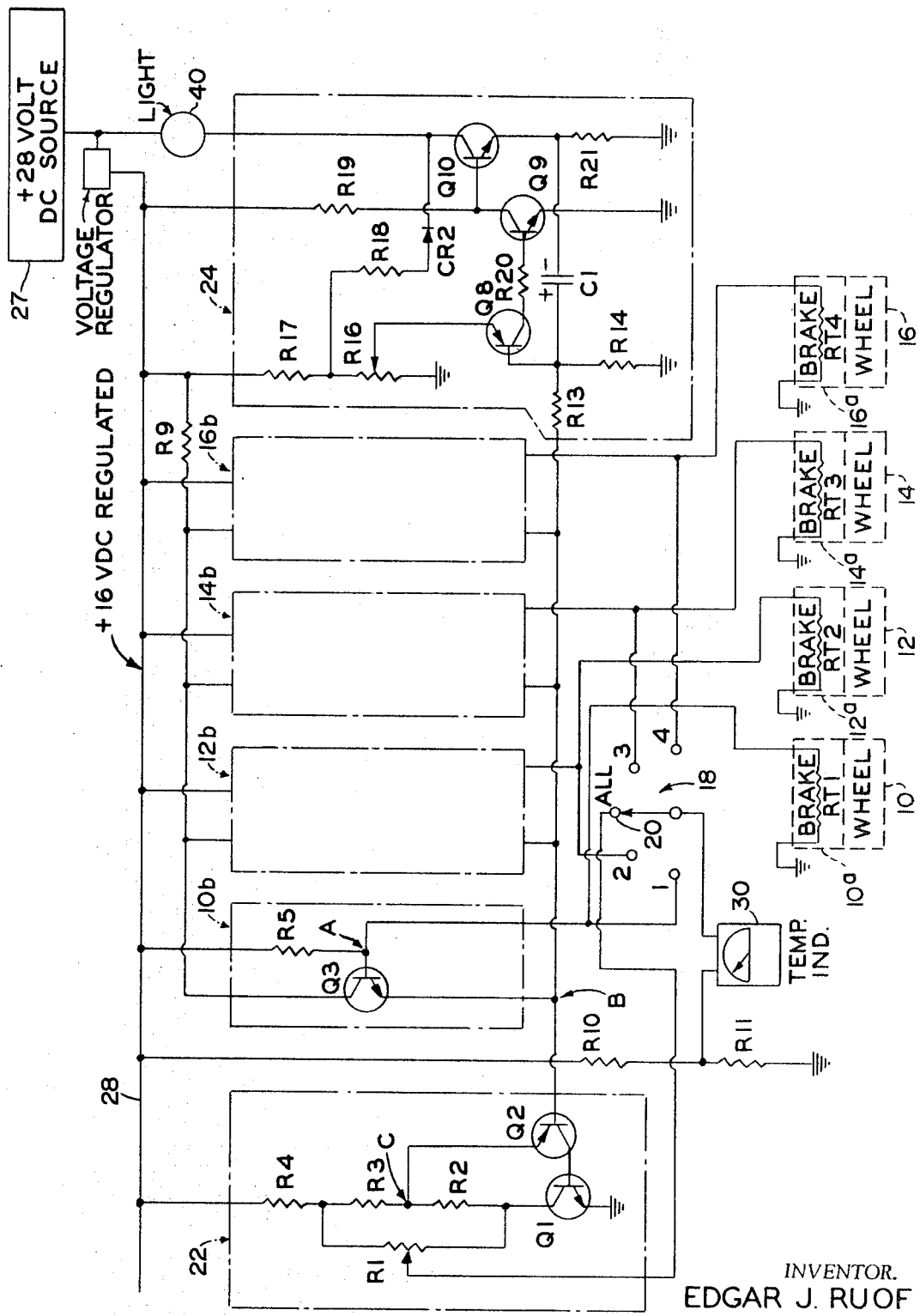
INVENTOR.
EDGAR J. RUOF
BY
Oldham & Oldham
ATTORNEYS.

BRAKE TEMPERATURE MEASURING SYSTEM HAVING ONE VISUAL METER AND ONE VISUAL HIGH TEMPERATURE INDICATOR

Heretofore it has been known that the temperature in brakes, particularly aircraft brakes, is highly critical to their operating performance, and that the indication of the temperature to the aircraft pilot is a very valuable piece of information. Some systems have been devised to indicate these temperatures, but they have been cumbersome, not reliable, and very expensive. Also, these prior art systems only indicate individual temperatures, and not the highest of all temperatures simultaneously.

The general object of the present invention is to provide an inexpensive, yet highly reliable temperature indicating system which utilizes only one visual meter indicator, and one visual light indicator to give brake temperature warning information rapidly, and reliably, to the aircraft pilot.

A further object of the invention is to provide a temperature indicator system for wheel brakes which system automatically indicates when any one of a plurality of brakes is higher than a predetermined safe temperature, and yet which allows individual brake temperature measurement.

The aforesaid objects of the invention and other objects which will become apparent as the description proceeds are achieved by providing a wheel and brake temperature indicator system which comprises a plurality of thermal transducers, one associated with each respective wheel and brake, an amplifier connected to each transducer, an additional amplifier for the highest signal from the transducer amplifiers, and a single temperature indicator switched to indicate the output of the individual transducers or to indicate the transducer at the highest temperature.

For a better understanding of the invention, reference should be had to the accompanying drawing which is a schematic block diagram showing the electrical circuitry utilized to achieve the objects of the invention.

With reference to the drawing, it should be understood that the invention relates to an electrical circuit for operating one warning light and one meter from a multitude of temperature transducers, each associated with a separate breaking mechanism. Specifically, four transducers numbered RT1 through RT4, as indicated in dotted brake blocks 10a through 16a are shown in the drawing associated with respective wheels 10 through 16.

A switch 18 is provided for reading the temperature of any one of the four transducers RT1 through RT4 or the hottest of the four. The "all" position, indicated by the numeral 20 of the switch 18, provides for reading the temperature of the hottest transducer.

The circuitry includes an "all" amplifier, indicated generally by the numeral 22, and surrounded by the dotted block, and a light control circuit indicated by dotted block 24. The operation of the light circuit 24 is independent of the position of the switch 18. The light is always caused to come on when the hottest of the transducers RT1 through RT4 reaches a predetermined temperature level.

The circuit further includes a plurality of 10b through 16b each containing a transistor Q3, and a resistor R5. A reference point, labeled A, is at the base of the transistor Q3. According to the best operating mode of the system, when RT is at 0° C., the voltage at point A is at 4.0 volts because R5 is 1,500 ohms, RT is then 500 ohms and a voltage on a line 26 is regulated at 16 volts DC as supplied from a 28 volt DC source 27. As the temperature of RT increases its resistance also increases, thus causing the voltage at point A to increase correspondingly.

The output from each of the transducer amplifiers 10 through 16 has one side connecting to a common 16 volt DC line 28 so that all of the amplifiers are operated from the same voltage. The Resistor R10 (3,000 ohms) and R11 (1,000 ohms), together form a voltage divider that produces 4.0 volts bias at the negative terminal of a visible temperature indicating meter 30. This bias potential causes the meter 30 to have no deflection at 0° C. Different values for R10 and R11 could be used so as to have no meter deflection at some other temperature and thus provide greater meter resolution.

The hottest transducer will produce the highest voltage at point A of its circuit and this will then establish the voltage at a common point B. The voltage at point B acts on both the light control circuit 24 and the "all" amplifier circuit 22.

ALL AMPLIFIER CIRCUIT 22

The amplifier circuit 22 minimizes loading of point B and provides a more accurate meter reading when the switch is at the "all" position 20. It thus gives substantially the same meter reading whether all transducers increase identically in temperature or one transducer increases faster than the others.

The voltage at point B will be less than the voltage at point A because of the voltage drop across the base-emitter junction of Q3. The voltage at point C in the amplifier circuit 22 will be higher than the voltage at point B because of the voltage drop across the emitter-base junction of the transistor Q2. Therefore, the voltage at point C is very near the same as the voltage at point A. Potentiometer R1 is bridged around the resistors R3 and R2 so that a voltage either slightly higher or slightly lower than the voltage at point C can be obtained at the adjustable arm of R1. This permits adjustment to compensate for slight variations in the characteristics of transistors Q2 and Q3. The remainder of the amplifier circuit 22 is made up of transistor Q1 with its emitter connected through to ground and resistor R4 which picks off its voltage supply from the plus 16 volt DC regulated supply line 28.

LIGHT CONTROL CIRCUIT 24

A reference voltage is applied from the 16 volt DC regulated voltage line 28 to the emitter of transistor Q8. This is made adjustable through a variable resistor R16 so that the turn-on point of the light can be set to a predetermined desired temperature in the laboratory. At temperatures below the turn-on point, Q8 is conductive which causes Q9 to also be conductive and causes Q10 to be nonconductive, thus keeping the light off.

As the temperature of the hottest transducer becomes higher, the voltage at point B also becomes higher which causes the voltage at the base of Q8 to become higher. When the voltage at the base of Q8 becomes sufficiently high, Q8 will begin to become less conductive. This initiates a regenerative action which gives snap-action turn-on of a light 40. With decreasing conduction by Q8, there will also be decreasing conduction by transistor Q9 which initiates conduction by transistor Q10. Conduction by Q10 causes a voltage to be developed across R21. This voltage is coupled by capacitor C1 to the base of Q8 which tends to regeneratively reduce conduction by Q8 and to increase conduction by Q10. Besides turning on the light 40, conduction by Q10 also permits a small current to flow through the resistor R18 and diodes CR2. This causes the voltage at the emitter of Q8 to decrease and thus assures that Q8 will remain nonconductive after the transient coupling through the capacitor C1 has disappeared.

When the temperatures of the transducers are decreasing, the light 40 will go out when the voltage at point B becomes low enough to permit Q8 to start to conduct. Conduction by Q8 reduces conduction by Q10 and thus reduces the voltage across R21. This voltage decrease is coupled by C1 to the base of Q8 which regeneratively causes Q10 to become nonconductive. This turns the light 40 off and blocks current through R18 and CR2, which causes an increase in the voltage at the emitter of Q8 and assures snap-action turnoff of the light 40. The value of R18 is selected so as to give the desirable overlap between turn-on and turnoff.

If it is desired to have additional lights which operate at other temperatures, additional similar light-control circuits can be used; and the potentiometers which correspond to R16 can be set to operate at the desired temperatures.

R13 and R14 are included in the light control circuit 24 to assist in the snap-acton turn-on and turnoff of the light.

Thus, it is seen that the objects of the invention have been provided by mounting thermal transducers in brakes by using a regulated DC voltage source, and a common output, with the output being amplified to reflect the highest voltage level on any of the transducers, and with the output of the "all" amplifier feeding a single visual temperature indication meter 30. This output voltage also controls actuation of a warning light in light control circuit 24 as determined by R16 to be at a preselected temperature, with the circuit being set so that a snap-on snap-off action is achieved in such circuit without a flickering or dimming of the light. This is assured by regenerative action provided through the resistor R18 and diode CR2. The switch 18 allows the individual temperature indication of any of the transducers on meter 30, whereas the light control circuit operates to indicate excessive temperature in any brake at any time. A switch similar to the switch 18 could be incorporated into the light control circuit to give individual light indication for each transducer.

While in accordance with the patent statutes only one best known embodiment of the invention has been illustrated and described in detail, it is to be understood that the invention is not limited thereto or thereby, but that the inventive scope is defined in the appended claims.

I claim:

1. A wheel and brake temperature indicator system which comprises
   a plurality of thermal sensors, each associated with a respective wheel and brake, the outputs of all the sensors being connected in parallel to a common point,
   circuit means connected to the common output of said sensors, said circuit means including a variable resistor adjustable to a predetermined level,
   a temperature indicator which is energized when the temperature of any sensor exceeds the predetermined level of the resistor in the circuit means,
   a power source,
   a normally nonconductive transistor in series connection with the power source and the indicator, and
   at least one normally conductive transistor to be rendered nonconductive when the current transmission characteristics of at least one of said sensors equals the preselected voltage reference of the variable resistor at which time said nonconductive transistor is made conductive thereby actuating the indicator.

2. A temperature indicator system according to claim 1 where the control circuit is regenerative to ensure a snap-on at a full voltage, and where such regeneration feature further allows the temperature sensed by the sensor to fall below the temperature at which the current transmission characteristics of the sensor equal the preselected reference voltage before the display device is regeneratively deenergized.

3. A temperature indicator system according to claim 1 further including
   a second temperature indicator,
   an amplifier connected to the common output of said sensors, and
   switch means for individually connecting said sensors to said second indicator to furnish an indication of the temperature at the individual sensor or the output of said amplifier to furnish an indication of the temperature at the sensor at the highest temperature.

4. A temperature indicator system according to claim 3 wherein said amplifier includes a variable resistor to set a predetermined reference point at which amplification will be effected to actuate said second indicating means and wherein said second indicating means comprises a visual meter.

5. A brake temperature indication system, comprising:
   at least two temperature sensors which transmit an amount of electrical current determined by their temperature, each mounted in close proximity to a respective brake;
   a constant DC voltage source having at least one output line,
   a control circuit electrically connected to the constant voltage source and to the temperature sensors in parallel, said control circuit comparing the voltage transmitted through each sensor with a preselected voltage, said control circuit being regenerative to increase snap-on full voltage and to allow the temperature sensed by the sensor to fall below the temperature at which the current transmission characteristics of the sensor equal the preselected voltage before said control circuit returns to an "off" state, and
   a display device actuated by said control circuit to provide an indication of high temperature in at least one of the sensors.